(12) United States Patent
Sweetland

(10) Patent No.: US 12,257,628 B2
(45) Date of Patent: Mar. 25, 2025

(54) PLATE MOUNTING IN ADDITIVE MANUFACTURING

(71) Applicant: VulcanForms Inc., Burlington, MA (US)

(72) Inventor: Matthew Sweetland, Bedford, MA (US)

(73) Assignee: VulcanForms Inc., Burlington, MA (US)

( * ) Notice: Subject to any disclaimer, the term of this patent is extended or adjusted under 35 U.S.C. 154(b) by 883 days.

(21) Appl. No.: 17/354,248

(22) Filed: Jun. 22, 2021

(65) Prior Publication Data

US 2021/0402480 A1 Dec. 30, 2021

Related U.S. Application Data

(60) Provisional application No. 63/043,267, filed on Jun. 24, 2020.

(51) Int. Cl.
*B22F 12/30* (2021.01)
*B22F 10/28* (2021.01)
*B22F 12/88* (2021.01)
*B23K 26/342* (2014.01)
*B33Y 10/00* (2015.01)
(Continued)

(52) U.S. Cl.
CPC .............. *B22F 12/30* (2021.01); *B22F 10/28* (2021.01); *B22F 12/88* (2021.01); *B23K 26/342* (2015.10); *B33Y 10/00* (2014.12); *B33Y 30/00* (2014.12); *B33Y 40/00* (2014.12)

(58) Field of Classification Search
CPC .......... B22F 10/28; B22F 10/68; B22F 12/17; B22F 12/30; B22F 12/88; B22F 2999/00; B23K 26/342; B29C 64/153; B29C 64/245; B33Y 10/00; B33Y 30/00; B33Y 40/00; Y02P 10/25

See application file for complete search history.

(56) References Cited

U.S. PATENT DOCUMENTS 9,597,730 B2   3/2017   Mironets
9,744,730 B2   8/2017   Comb
(Continued)

FOREIGN PATENT DOCUMENTS

WO   WO 2017/051029 A1   3/2017
WO   WO 2017/093591 A1   6/2017
WO   WO 2019/197281 A1   10/2019

OTHER PUBLICATIONS

International Search Report and Written Opinion mailed Nov. 15, 2021 for International Application No. PCT/US2021/038421.
(Continued)

*Primary Examiner* — Dana Ross
(74) *Attorney, Agent, or Firm* — Wolf, Greenfield & Sacks, P.C.

(57) ABSTRACT

Build plate assemblies and their methods of use for an additive manufacturing system are disclosed. In some embodiments, a build plate assembly may include a build plate with a build surface and one or more recesses formed in the build plate. One or more inserts may be inserted into the corresponding one or more recesses of the build plate such that a portion of the one or more inserts are accessible through one or more corresponding openings formed in the build surface associated with the recesses.

41 Claims, 12 Drawing Sheets

(51) Int. Cl.
  B33Y 30/00 (2015.01)
  B33Y 40/00 (2020.01)

(56) References Cited

U.S. PATENT DOCUMENTS

| | | |
|---|---|---|
| 9,956,612 B1 | 5/2018 | Redding et al. |
| 10,022,795 B1 | 7/2018 | Redding et al. |
| 10,286,451 B2 | 5/2019 | Hart et al. |
| 2015/0314403 A1 | 11/2015 | Bruck et al. |
| 2016/0158889 A1 | 6/2016 | Carter et al. |
| 2016/0368050 A1 | 12/2016 | Morris et al. |
| 2017/0021455 A1 | 1/2017 | Dallarosa et al. |
| 2017/0056975 A1 | 3/2017 | Carter et al. |
| 2018/0117854 A1 | 5/2018 | Hart et al. |
| 2018/0193923 A1 | 7/2018 | Koch et al. |
| 2018/0200792 A1 | 7/2018 | Redding et al. |
| 2018/0207722 A1 | 7/2018 | Feldmann et al. |
| 2018/0236549 A1 | 8/2018 | Spears et al. |
| 2018/0333813 A1 | 11/2018 | Hornbeck |
| 2019/0030806 A1* | 1/2019 | Herman ............... B29C 64/106 |
| 2019/0143406 A1 | 5/2019 | Carter et al. |
| 2019/0240782 A1 | 8/2019 | Tempco |
| 2019/0299286 A1 | 10/2019 | Feldmann et al. |
| 2019/0381731 A1 | 12/2019 | Walsh et al. |
| 2020/0039000 A1 | 2/2020 | Sweetland |
| 2020/0108465 A1 | 4/2020 | Sweetland |

OTHER PUBLICATIONS

Invitation to Pay Additional Fees mailed Sep. 1, 2021 for International Application No. PCT/US2021/038421.

* cited by examiner

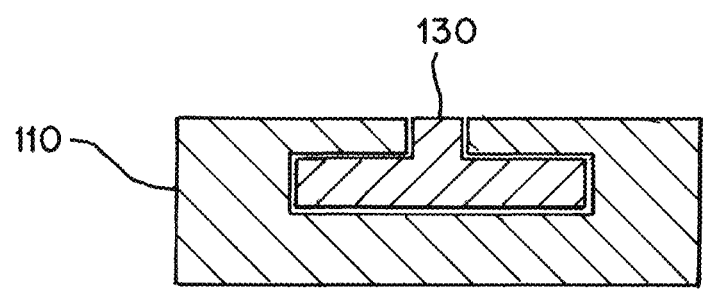
Fig. 7A
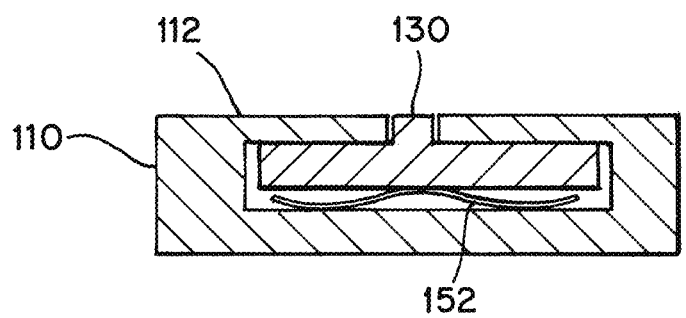
Fig. 7B
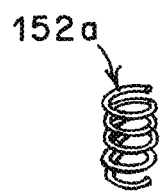 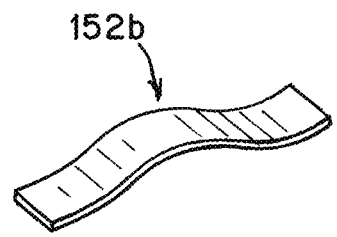 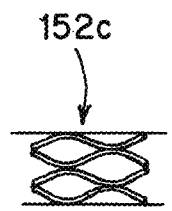
Fig. 7C          Fig. 7D          Fig. 7E

PLATE MOUNTING IN ADDITIVE MANUFACTURING

CROSS-REFERENCE TO RELATED APPLICATIONS

This application claims the benefit of priority under 35 U.S.C. § 119(e) of U.S. Provisional Application Ser. No. 63/043,267, filed Jun. 24, 2020, the disclosure of which is incorporated herein by reference in its entirety.

FIELD

Disclosed embodiments are related to systems and methods for plate mounting in additive manufacturing.

BACKGROUND

Powder bed fusion processes are an example of additive manufacturing processes in which a three-dimensional shape is formed by selectively joining material in a layer-by-layer process. In metal powder bed fusion processes, one or more laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

SUMMARY

In some embodiments, a build plate assembly for an additive manufacturing system includes a build plate and an insert. The build plate includes a build surface and a recess formed in the build plate. A portion of the recess forms an opening in the build surface. The insert is configured to be inserted into the recess of the build plate. The insert and the recess are sized and shaped to retain the insert in the recess. At least a portion of the insert is accessible through the opening.

In some embodiments, an additive manufacturing method for reducing thermally induced stresses during an additive manufacturing process includes inserting an insert into a build plate, wherein at least a portion of the insert is accessible through an opening in a build surface of the build plate. The method additionally includes retaining the insert in the build plate, depositing a layer of material on the build surface and the accessible portion of the insert, and melting a first portion of the layer of material, wherein the first portion is disposed on the accessible portion of the insert. The method also includes solidifying the melted first portion to form a first attachment point on the insert.

In some embodiments, a build plate assembly for an additive manufacturing system includes a build plate and a plurality of inserts. The build plate includes a build surface and a plurality of recesses formed in the build surface. The plurality of inserts are configured to be disposed at least partially within the plurality of recesses of the build plate. At least a portion of each of the plurality of inserts is accessible through an opening in the build surface. Each of the plurality of inserts is configured to be retained in at least one of the plurality of recesses.

In some embodiments, an additive manufacturing method for reducing thermally induced stresses during an additive manufacturing process includes inserting a plurality of inserts partially into a plurality of recesses formed in a build surface of a build plate, wherein at least a portion of each of the plurality of inserts is accessible through at least one opening in the build surface. The method additionally includes retaining the plurality of inserts in the plurality of recesses, depositing a layer of material on the build surface and the portions of the plurality of inserts accessible through the openings in the build surface, melting at least a first portion of the layer of material disposed on the accessible portions of the plurality of inserts, and solidifying the first melted portion to form a first attachment point on at least one of the plurality of inserts.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 7A is a cross-sectional side view of one embodiment of an insert disposed within a recess of a build plate;

FIG. 7B is a cross-sectional side view of one embodiment of a build plate including a spring configured to bias an insert disposed within a recess of the build plate;

FIG. 7C depicts one embodiment of the spring of FIG. 7B;

FIG. 7D depicts one embodiment of the spring of FIG. 7B;

FIG. 7E depicts one embodiment of the spring of FIG. 7B;

DETAILED DESCRIPTION

Figure 1:
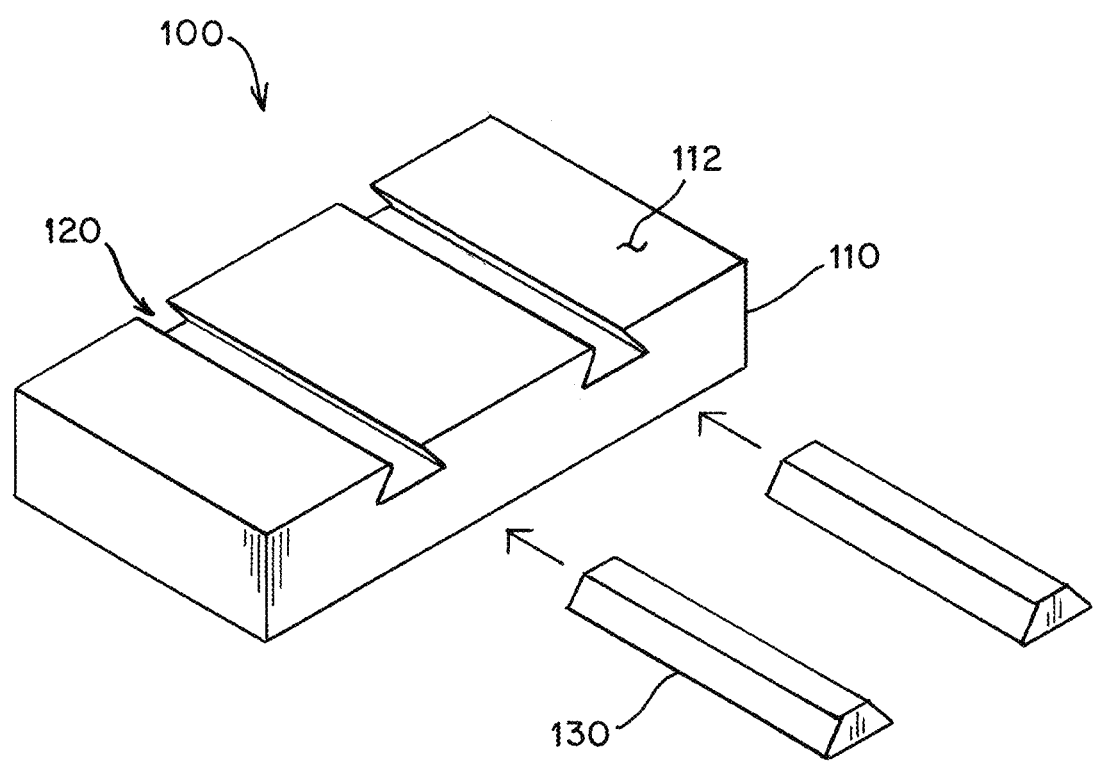
FIG. 1 is a perspective view of one embodiment of a build plate with parallel linear inserts.

As described above, some additive manufacturing processes, such as powder bed fusion processes, may use laser beams to melt metal powder. Typically, forming the initial layers of a printed part may include melting metal powder disposed directly on a build surface, such as a top surface of a rigid build plate. The melted powder of these initial layers may then cool and solidify, and may fuse directly to the underlying build plate. Subsequent layers may then be built upon these initial layers. When the build is complete, the final printed part may need to be removed from the underlying build plate to which it may be rigidly adhered.

There may be numerous challenges associated with printing parts directly on a build plate. During post-processing of a print, there may be challenges related to the removal of the build plate from the additive manufacturing machine, separation of the printed part(s) from the build plate, refinishing of the build plate before the next build, and more. During a conventional additive manufacturing process, a build plate may be clamped or otherwise mounted into an additive manufacturing machine. After the build is complete, the build plate may be removed from the machine, the printed parts may be separated from the build plate, and the build plate may be refinished. Each of these steps may present challenges. Physical removal of a build plate from an additive manufacturing machine may be a slow, awkward, and laborious process, particularly if a build plate is large and heavy. Separation of the printed parts from the build plate may include using a band saw, wire EDM, breakable mounts, and/or other machining processes. The separation process may be difficult, time consuming, and may risk compromising the integrity of the printed part. After separation, the build plate may be refinished (e.g., milled, ground, or polished) to establish a clean build surface, and then may be returned to the additive manufacturing machine for use in a subsequent build process. Refinishing a large build plate may be a time consuming and/or difficult task. Also, a single build plate may only be milled or otherwise refinished a finite number of times before being discarded and replaced. Because build plates may be expensive, frequently replacing a build plate may be undesirable. As printed parts become larger and/or heavier, the difficulties and costs associated with physically handling and processing the build plate and/or printed part(s) may also increase.

In addition to post-processing concerns, printing directly on a build plate may be associated with additional challenges related to the additive manufacturing process itself. Without wishing to be bound by theory, different portions of an additive manufacturing system may be associated with different rates of thermal expansion and/or contraction, depending on variables including but not limited to different materials, different geometries, and different amounts of heat delivered and/or dissipated. For example, during a printing process, the temperature of a liquid melt pool may be significantly higher than a temperature of an underlying build plate. As the melt pool cools and solidifies into a weld, the temperature change of the melt pool may differ significantly from the temperature change of the build plate; correspondingly, the melt pool and the build plate may naturally experience different amounts of thermal contraction if allowed to cool in an unconstrained state. However, because the cooling melt pool may be constrained by the build plate along their mating faces, the build plate may prevent portions of the melt pool from fully contracting. Consequently, different portions of a melt pool may contract to different degrees, which may result in residual stress in the printed material and/or the underlying build plate. While a heated build plate may help to mitigate differential thermal shrinkage of the printed part, it may be difficult to reduce the induced stresses to a negligible level.

Induced stress may be problematic for both the printed part and for the build plate. A printed part may deform and "peel away" or "curl up" from a build surface, potentially interfering with other layers of the print process (e.g., during recoating). In some instances, if severe thermal stress develop, total delamination of a printed structure from a build plate may occur which may compromise an entire build. Even if a build is able to finish, part deformation may remain after the part is removed from the build plate. Residual thermal stress may also weaken the part and compromise its functionality. Additionally, stress in the printed structure may induce an associated stress in the build plate. Depending in part on the size of the printed structure, this induced stress may be sufficient to bend or otherwise deform a build plate. For example, a large printed part with significant thermal stress may bend a two inch thick steel build plate and permanently deform it. A deformed build plate may be undesirable in that subsequent layers may be printed on a non-flat build surface, potentially compromising the fidelity of a build.

In view of the above, the inventors have recognized and appreciated that it may be advantageous to modify a build plate to allow for one or multiple components that may be easily inserted into a build plate before printing and removed after printing. More specifically, rather than printing directly on the build plate, the inventors have recognized and appreciated the benefits associated with printing on one or more inserts inserted into and retained in one or more recesses within the build plate during an additive manufacturing process.

Printing at least a portion of a part on a removable insert may be associated with certain benefits, related to both post-processing of a print as well as a print process itself. Rather than removing the entire build plate from the additive manufacturing machine, one or more inserts may be removed. As the inserts may be significantly smaller and lighter, this process may save significant time and effort. Additionally, separating a part from an insert in a machining process (or other process) may be faster and easier than separating a part from a large, heavy build plate. As such, removing a part built on inserts may be faster, less cumbersome, and easier than removing a part built directly on a build plate. Furthermore, a build plate with removable inserts may be able to be reused immediately without refinishing as the surface of the build plate may not have been compromised during the build process. Rather, inserts can be refinished and reused, which may be more time- and resource-efficient than refinishing an entire build plate. After an insert has been reused a number of times, replacing a used insert with a new insert may be substantially less expensive and resource intensive than replacing an entire build plate. Alternatively, new inserts may be used for each build process. Storing replacement inserts may be more cost effective and may demand significantly less storage space compared to storing replacement build plates. Overall, using inserts may be associated with savings related to time, money, and resources during post-processing of a print.

Additional benefits related to the printing process itself may also be realized by printing on inserts rather than printing directly on a build plate. For example, residual thermal stresses and distortions in the printed part and/or build plate may be reduced. In one such embodiment, a substantially linear insert inserted into a recess of a build plate may have one end constrained and one end free. As material printed on the insert changes temperature and expands or contracts, the insert may expand or contract along the length of the insert under the applied stresses to a greater degree than the build plate. Because the substrate (i.e., the insert) constrains the contraction of the printed material to a lesser degree than a build plate as the printed material cools, the amount of residual thermal stress within the printed part may be significantly reduced. Reducing residual stress in a printed part may be associate with less deformation in the part, greater structural integrity in the part, and lower rates of build plate deformation. In some embodiments, a build plate may be pre-heated to a temperature greater than ambient temperature prior to or during a build in an attempt to reduce the temperature differential between the printed part and the build surface, which may in turn reduce the amount of residual stress.

In some embodiments, a build plate assembly for an additive manufacturing system may include a build plate and one or more inserts. The build plate may include a build surface (such as a top surface of the build plate oriented towards an energy source (e.g. a laser energy source) when the build plate is mounted in an additive manufacturing machine) and one or more recesses formed in the build plate.

The inserts may be configured to be inserted into the recesses of the build plate. The inserts and the recesses may be sized and shaped to retain the inserts in the recesses. As explained in greater detail below, a recess may form an opening in the build surface of the build plate through which at least a portion of an insert inserted into the recess may be accessible. In some embodiments, a portion of an insert may extend outward from a build surface, though embodiments in which an insert does not extend out of a recess are also contemplated. For example, a portion of an insert may extend through the opening in the build surface formed by the recess in which the insert is inserted. During an additive manufacturing process, the printed part may be printed directly onto the portions of the inserts accessible through the openings in the build surface and/or on the portions of the inserts extending through the openings in the build surface.

In some embodiments, an additive manufacturing method for reducing thermally induced stresses during an additive manufacturing process may include inserting one or more inserts into one or more recesses of a build plate. In some embodiments, an insert may be inserted into a recess from a side of a build plate, while in other embodiments an insert may be inserted into a recess from above a build plate. At least a portion of each insert may be accessible through openings in a build surface of the build plate. The method may include retaining the inserts in the build plate, and depositing a layer of material on both the build surface and the portions of the inserts accessible through the openings. The inserts may be retained in the recesses due to the corresponding interlocking geometries of the recesses and the inserts, and/or with the aid of a locking mechanism. Portions of the layer of material disposed on the inserts may then be melted using one or more laser beams. The melted portions may cool and solidify, thereby forming attachment points on the inserts. The method may further include additively manufacturing a part on the attachment points, removing the inserts from the build plate, and separating the printed part from the inserts.

In some embodiments, a recess in a build plate may be substantially linear, such that a length of the recess may extend in a direction parallel to a build surface of a build plate. In some embodiments, a recess may extend to at least one edge of a build plate, such that an end of the recess may be accessible from a side of the build plate. An insert may be configured to be inserted into and/or removed from the recess from a side of the build plate. In some embodiments, a recess may extend across a width of a build plate, such that an insert may be inserted into and/or removed from the recess from more than one side of the build plate. In some embodiments, the geometry of the recess and/or the insert may be configured such that the insert may be unable to be inserted into and/or removed from the recess in a direction perpendicular to the build surface. However, in some embodiments an insert may be able to be inserted from a direction perpendicular to the build surface as the disclosure is not limited to inserts that are only able to be inserted and/or removed from a side of the build plate.

An insert may be configured to expand and/or contract within a recess. In some embodiments, an insert may be constrained and/or fixed to the build plate at only one end within a recess. If one end of an insert is constrained, the insert may expand and/or contract within the recess in a direction parallel to a direction in which a portion of the recess the insert is located in extends. Thus the insert may expand and/or contract as a part printed on the insert expands and/or contracts to at least partially accommodate the deformation of the part, which may reduce stress in the part and/or the insert. In some embodiments, an insert may be configured to expand/contract in a single, linear direction, while in some embodiments an insert may be configured to expand/contract in multiple directions. In some embodiments, a linear insert may be constrained and/or fixed to the build plate at both ends. In some embodiments, an insert may be pre-stressed, such as being pre-tensioned or pre-compressed. Pre-stressing the insert in either tension or compression may reduce stress on the printed part.

In some embodiments an insert may have different compliances and/or stiffnesses in different directions when assembled in a build plate. For example, an insert may be compliant in a direction parallel to the build surface, but may be very stiff in a direction perpendicular to the build surface. In some embodiments, a stiffness of an insert in a direction perpendicular to the build surface may be greater than a stiffness of the insert in a direction parallel to the build surface. Without wishing to be bound by theory, a stiffness of an insert may be determined, at least in part, by the material and/or the geometry of the insert.

It should be appreciated that an insert may comprise any suitable materials. In some embodiments, an insert and a build plate may be made of the same material, while in other embodiments an insert and a build plate may be made of different materials. The material of an insert may be selected at least in part due to the material and/or geometry of the part to be printed. Adapting the insert material to the specific part to be printed may enable better control over thermal expansion and/or stress. For example, the material of the insert may be selected in an attempt to match the thermal expansion of the insert to the predicted thermal expansion of the part to be printed. Other relevant parameters may include the designed lateral stiffness, operating temperature (e.g., pre-heat temperature), and/or a temperature of a melt pool. In one such embodiment, a coefficient of thermal expansion of the insert may be within 10%, 25%, 50%, 75%, 100%, 150%, 200%, 400%, 1000% and/or any other appropriate percentage of the coefficient of thermal expansion of the material used to print an associated part.

An insert may include geometrical features that may affect stiffness properties of the insert and/or that may partly determine how an insert interfaces with a recess of a build plate. In some embodiments, a cross-section of an elongated insert may include portions of different widths, wherein a width may include a direction perpendicular to a length of the insert which may be parallel to an axial length of an associated recess when the insert is assembled with a build plate. In some embodiments, a portion of an insert may be wider than a width of an opening in the build surface through which the recess and insert are accessible. In this way, an insert may be prevented from being displaced through the opening of the recess in the build surface.

Depending on the embodiment, an insert may either have a constant or variable cross sectional size and/or shape along its length. For example, varying the cross-sectional size and/or shape of an insert may have advantages related to controlling a stiffness of the insert in a particular direction and/or reducing an amount of material used in manufacturing the insert. In some embodiments, the stiffness of the insert along the length of the insert may be customized for a specific part to be printed.

In some embodiments, a build plate assembly may include one or more locking components configured to secure an insert within a recess. A locking component may include a shaft, a wedge, a pin, a set screw, or any other component configured to prevent motion of an insert relative to a build plate after the insert is inserted into the build plate. Correspondingly, in some embodiments, the locking component may mechanically lock with one or more features of an insert such as corresponding holes, indentations, surfaces a set screw may engage with, and/or other appropriate feature. Alternatively, a locking component may be inserted into or otherwise engaged with a portion of a build plate to prevent motion of an adjacent portion of an insert as detailed further below. Further, in some embodiments, a locking component may be removed prior to removal of an insert.

In some embodiments, an insert may comprise a single piece, while in some embodiments an insert may comprise a plurality of separate segments. For example, an insert may be made from segments stacked together. In some applications such an arrangement may be advantageous due to an insert comprised of a plurality of segments potentially enabling easier removal of smaller printed parts in certain applications. Additionally, in some embodiments, different segments of an insert may be comprised of different materials, which may enable the use of an insert including different effective coefficients of thermal expansion over a length of the insert. The ability to customize the effective coefficient of thermal expansion of the insert as a function of the insert's length may be beneficial in reducing thermal stress during a printing process.

In some embodiments, a single insert may be inserted into a single recess. An insert may entirely fill a recess such that the insert and recess form a slip fit when the insert is inserted into the recess. Alternatively, portions of the recess may remain empty when an insert is fully inserted into the recess. In some embodiments, multiple independent inserts may be inserted into the same recess. It should be appreciated that any suitable number of inserts may be inserted into a single recess as the disclosure is not limited in this regard. It should also be appreciated that a single insert may be inserted into multiple recesses as the disclosure is not limited in this regard.

In some embodiments, a transverse cross sectional size and/or shape of an insert may complement a transverse cross sectional size and/or shape of a recess. For example, a trapezoidal insert may be configured to be inserted into a trapezoidal recess. Alternatively, a semi-circular insert may be configured to be inserted into a semi-circular recess. Other appropriate shapes may include, but are not limited to, triangular, rectangular, circular, ovular, semi-ovular, and/or any other appropriate shape However, it should be appreciated that an insert size and/or shape need not be the same as (or similar to) a recess size and/or shape, as the present disclosure is not limited to build plate recesses and inserts with complementary sizes and/or shapes.

The tightness and/or looseness of a fit between an insert and a recess may be different in different embodiments. In some embodiments, an insert may be sized to form a tight fit with little to no slop in the fit within a recess similar to a slip fit. However, in some embodiments, an insert may be sized to form a loose fit in a recess. In some embodiments, an insert may be undersized from a recess by between 0.20 mm and 4.0 mm. However, different amounts of undersizing both greater and less than those noted above are envisioned depending on the particular application and size of the build plate and insert being used.

In some embodiments, a biasing mechanism may be used to control a position of an insert within a recess. For example, a biasing mechanism may bias an insert against a portion of a recess. Depending on the embodiment, the insert may be biased in a direction oriented towards the build surface. However, embodiments in which the insert is biased in other directions including, for example, away from the build surface are also contemplated. In either case, due to the use of the biasing mechanism the insert may be reliably and securely positioned in a desired orientation and/or position within a corresponding recess. In contrast, the same insert in the same recess without a biasing mechanism may form a loose fit. Thus, a biasing mechanism may facilitate easier insertion, adjustment, and/or removal of an insert from within an associated recess. A biasing mechanism may include a leaf spring, coil spring, wavy washer stack, set screw, or any other suitable mechanism configured to bias an insert in a desired direction within a recess.

It should be appreciated that an insert need not be elongated and/or linear. In some embodiments, an insert may form structures such as a grid and/or an island. Correspondingly, a recess need not be elongated and/or linear. In some embodiments, a recess may be circular, square, triangular, or any other suitable shape. In some embodiments, a plurality of recesses may also intersect with one another and may be configured to receive one or more insert therein. For example, a plurality of substantially linear recesses may intersect one another at perpendicular angles in a grid like fashion in order to receive an insert in the shape of a grid similar to a structural honeycomb.

In some embodiments, an insert (including but not limited to a non-linear insert) may be inserted into a recess of a build plate from a direction perpendicular to a build surface (e.g., from above a build plate), rather than from a side of a build plate. A build plate assembly that includes inserting an insert into a recess of a build plate from above may include additional components configured to constrain the insert in the recess. For example, one or more locking shafts and/or attachment plates may be used, as explained in greater detail in reference to the figures below.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of a build plate assembly 100 that includes a build plate 110 and inserts 130. The build plate 110 may include a build surface 112 and recesses 120. The inserts 130 may be configured to be inserted into and retained in the recesses 120 formed in the build plate 110. The inserts 130 may be configured to be slid into the recesses 120 from a side of the build plate 110, and the inserts 130 may be slidably retained in the recesses 120. For example, as shown in the depicted embodiment, the recesses correspond to elongated recesses with transverse cross sectional shapes taken perpendicular to their length that are trapezoidal with an opening in the build surface connected to at least a portion of the recess along its length. Correspondingly, the inserts have similarly shaped and sized cross sectional profiles that are sized and shaped to be inserted into the recess such that a portion of the inserts located proximate to the build surface are exposed. Though different cross sectional shapes and arrangements may also be used. In some embodiments, a build plate assembly 100 may include a plurality of recesses 120 and a plurality of inserts 130. For instance, as shown in the depicted embodiment, the plurality of recesses and/or inserts may be arranged such that they are parallel to each other when the inserts are assembled with the build plate, as shown in FIG. 1. However, in some embodiments, a build plate assembly may include a single recess and/or a single insert, as the disclosure is not limited in this regard.

Using the disclosed inserts and recess, the thermal stresses generated during an additive manufacturing process may be delivered primarily or entirely to an insert as opposed to the build plate. As described above, an insert 130 may be constrained only at one end in some embodiments, and thus may be able to expand and/or contract in response to changing thermal conditions. Because the insert 130 may be allowed to expand and/or contract along its length within the recess 120, printing on an insert may be associated with less part deformation compared to printing directly on a build surface 112 of a build plate 110. Without wishing to be bound by theory, if a part is printed only on a build plate, the build plate may be unable to contract sufficiently to accommodate full contraction of the printed part as it cools. Consequently, the printed part may be unable to contract fully, resulting in higher residual stresses. If a part is printed on an insert, a force exerted by the printed part on the insert as the part cools and contracts may cause the insert to contract. Because the part is able to contract, there may be lower residual stress in the printed part. In some embodiments, a printed part is attached only to one or more inserts 130 and not to the build surface 112 of the build plate 110. However, in some embodiments, a printed part may be attached to the build surface 112 in addition to being attached to one or more inserts 130. A printed part may form any suitable number of attachment points to a build surface 112 and/or one or more inserts 130, as the disclosure is not limited in this regard.

FIGS. 2A-2D depict transverse cross-sectional geometries of different embodiments of an insert 130 disposed within a recess 120 of a build plate 110. An insert 130 may be shaped or otherwise configured to be retained within a recess 120. In some embodiments, a shape of an insert may complement a shape of a recess, such that the insert and recess fit together in a lock-and-key type interface. However, it should be appreciated that the present disclosure is not limited to build plate recesses and inserts with complementary and/or similar shapes. In some embodiments, a cross-section of an insert and/or a recess may include a "body" and a "neck". A body may be a comparatively wide portion of the insert and/or recess, while the neck may be comparatively narrow. The neck of an inert may include a portion that extends out of a recess and/or a portion on which printed material may be deposited. A neck of a recess may at least partially form an opening in the build surface. While the depicted inserts have necks that extend to a height within a corresponding opening that is approximately flush with a corresponding surface of the build plate, embodiments in which the inserts include portions that extend above and/or below the build surface within the corresponding openings in the recess are also contemplated. Non-limiting examples of the cross-sectional shape of an insert and/or recess body may include a rectangle, a square, a triangle, a trapezoid, a circle, a semi-circle, or a diamond, to name a few examples. Of course, other shapes are contemplated, and the disclosure is not limited in this regard. It should be appreciated that, in some embodiments, an insert and/or a recess may not include a body and/or a neck, and the disclosure is not limited to inserts and/or recess that include bodies and/or necks.

Figure 2A:
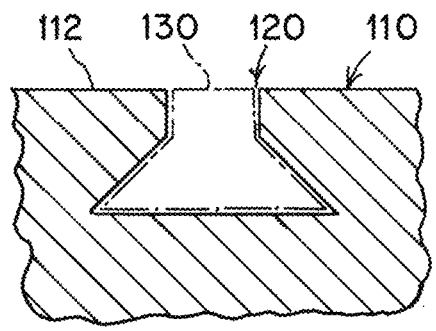
FIG. 2A is a cross-sectional side view of one embodiment of an insert disposed within a recess of a build plate.
Figure 2B:
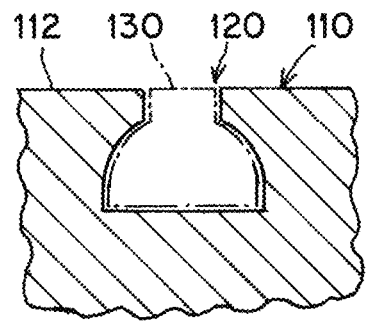
FIG. 2B is a cross-sectional side view of one embodiment of an insert disposed within a recess of a build plate.
Figure 2C:
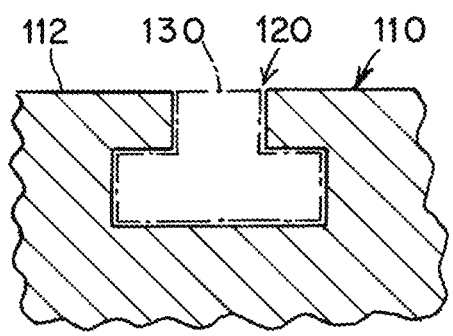
FIG. 2C is a cross-sectional side view of one embodiment of an insert disposed within a recess of a build plate.

As shown in FIGS. 2A-2C, an insert 130 may include a narrow portion proximate to an opening in the build surface 112 of a build plate 110 and a comparatively wide portion distanced from the opening in the build surface 112. That is, in some embodiments, a cross-sectional geometry of an insert 130 may taper or otherwise reduce in width in a direction from a portion of the insert that is distanced from an opening formed in the build surface 112 (e.g., from a base of the body) to a portion of the insert 130 proximate to the opening in the build surface 112 (e.g., to a top of the body, or to the neck). The tapering and/or reduction in width in some embodiments may be continuous and/or monotonic, although non-continuous and/or non-monotonic reductions in width of an insert's cross-sectional geometry are also contemplated.

Figure 2D:
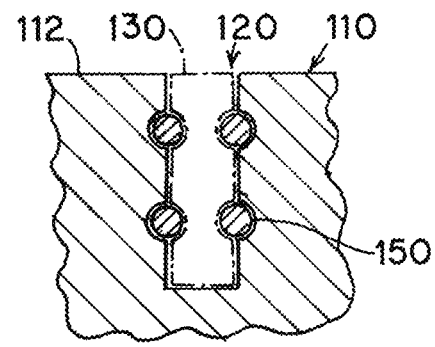
FIG. 2D is a cross-sectional side view of one embodiment of an insert disposed within a recess of a build plate.

As shown in FIG. 2D, a cross-section of an insert may not taper in some embodiments. For example, a substantially rectangular insert 130 may be inserted into a substantially rectangular recess 120 though other approximately constant dimension recesses with correspondingly sized and shaped openings in the build surface may be used. In either case, in some embodiments, an insert may be retained in a recess of a build plate using one or more locking shafts 150. In embodiments including a locking shaft 150, an insert 130 may first be inserted into a recess 120 of a build plate 110. A locking shaft 150 may then be inserted into the build plate 110 such that the locking shaft engages corresponding portions of the recess and insert to prevent motion of the insert 130 relative to the build plate 110. For example, as shown in FIG. 2D, a substantially rectangular recess 120 may include semi-circular voids. A substantially rectangular insert 130 may also include semi-circular voids, such that, when the insert 130 is inserted into the recess 120, the semi-circular voids align to form circular voids. Inserting circular locking shafts 150 into the circular voids may retain the insert 130 within the recess 120. Locking shafts may be used to fix an insert that may be otherwise unconstrained within a recess, or to provide additional reinforcement for a tapered insert. It should be appreciated that locking shafts may be used with inserts of any cross-sectional geometry, whether tapered or not, as the disclosure is not limited in this regard. A locking shaft may be removed prior to removing an insert from a build plate.

Figure 3A:
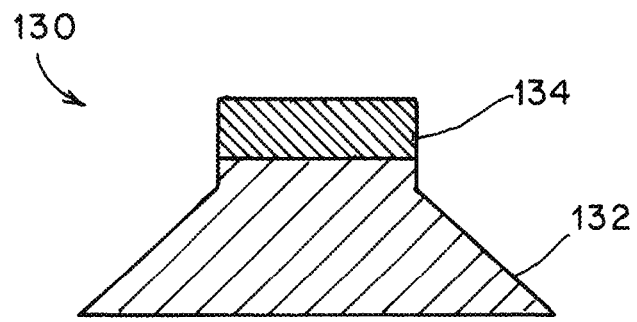
FIG. 3A is a cross-sectional side view of one embodiment of an insert with a consumable portion.
Figure 3B:
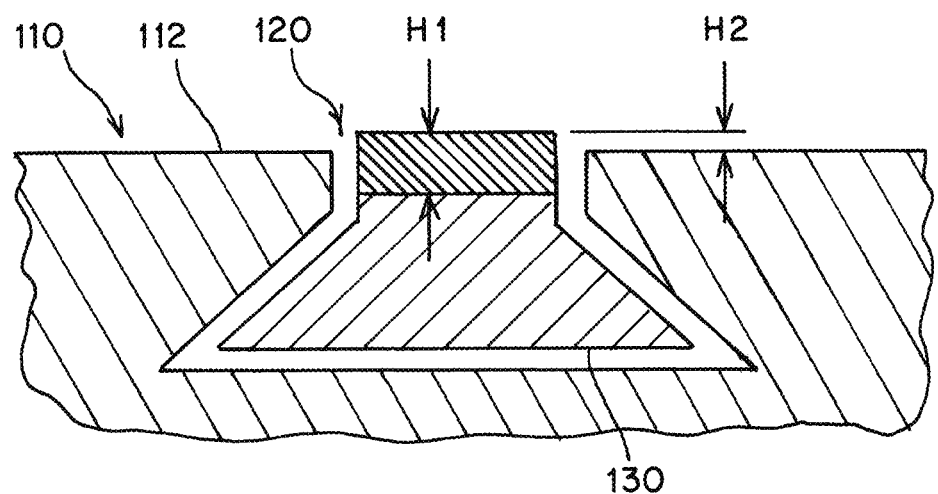
FIG. 3B is a cross-sectional side view of the insert of FIG. 3A disposed within a recess of a build plate.

FIGS. 3A-3B show one embodiment of an insert 130 that includes a reusable portion 132 and a consumable portion 134. As described above, after separating a printed part from an inert, the insert may be milled, ground, polished, or otherwise post-processed to reestablish a flat surface. An insert 130 may include a consumable portion 134 that may be gradually removed during multiple post-processing iterations. After each iteration of post-processing, a height H1 of the consumable portion 134 may be continually reduced, until the consumable portion is entirely removed. At this point, an insert 130 may be discarded in favor of a new insert with an unused consumable portion. It should be appreciated that there may be no physical distinction between a consumable portion 134 and a reusable portion 132 of an insert 130, as an insert may be monolithic in some embodiments. In some embodiments, the consumable portion 134 and the reusable portion 132 of an insert 130 may differ in material, porosity, coating, or any other appropriate characteristic. It should be appreciated that in some embodiments, an insert may be single-use, and may not be refinished and reused in a subsequent build. In such embodiments, an insert may not include separate consumable and reusable portions.

As shown in FIG. 3B, a portion of an insert 130 may extend out of a recess 120 through an opening in the build surface 112 such that a portion of the insert 130 may be disposed above the build surface 112. For example, a top surface of an insert 130 may extend a height H2 above a build surface 112. It should be appreciated that the height H2 above the build surface 112 that an insert 130 extends may not be related to the height H1 of the consumable portion 134 of an insert 130. Of course, in some embodiments, an insert 130 may be considered unusable when the insert no longer extends above the build surface 112 (i.e., when H2<0), in which case H1 may be identical to H2. However, embodiments of an insert in which H1 is greater than or less than H2 are also contemplated, as the disclosure is not so limited. Additionally, as noted above, embodiments in which an insert does not include a portion that extends above the build surface during use are also contemplated.

Figure 4:
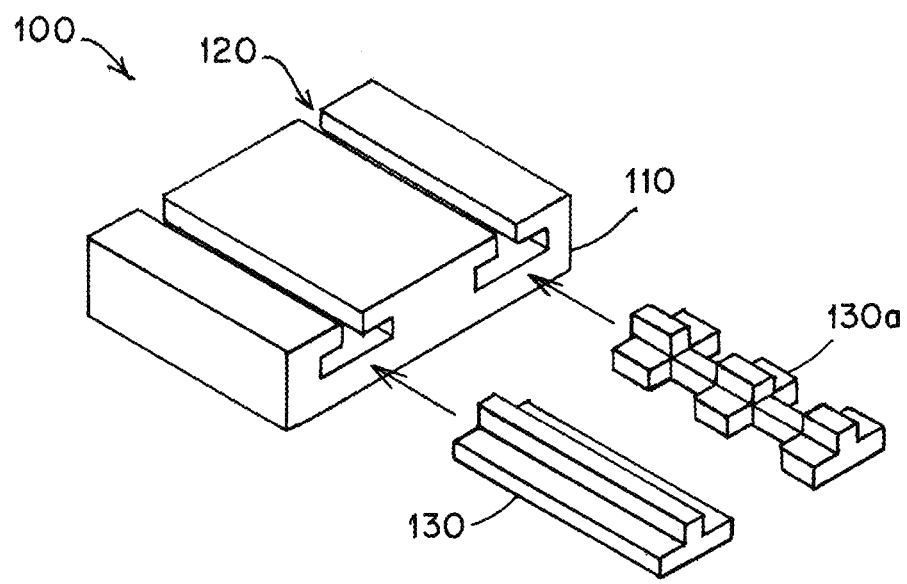
FIG. 4 is a perspective view of one embodiment of an insert with a variable cross-section.

It should be appreciated that the cross-section of an insert along its length need not be uniform. FIG. 4 depicts one embodiment of an insert 130a with a variable cross-section. A variable cross-section may be used to change the longitudinal stiffness of the insert. An insert with a variable cross-section may be obtained by machining, molding, or otherwise forming an insert to the desired shape from a single piece of stock material, or by serially coupling together multiple separate segments with different transverse cross-sectional shapes and sizes to build up a single insert. In the latter case, the different segments may be comprised of different material in order to better tune the stiffness and thermal expansion properties of the insert 130a with a variable cross-section.

Figure 5:
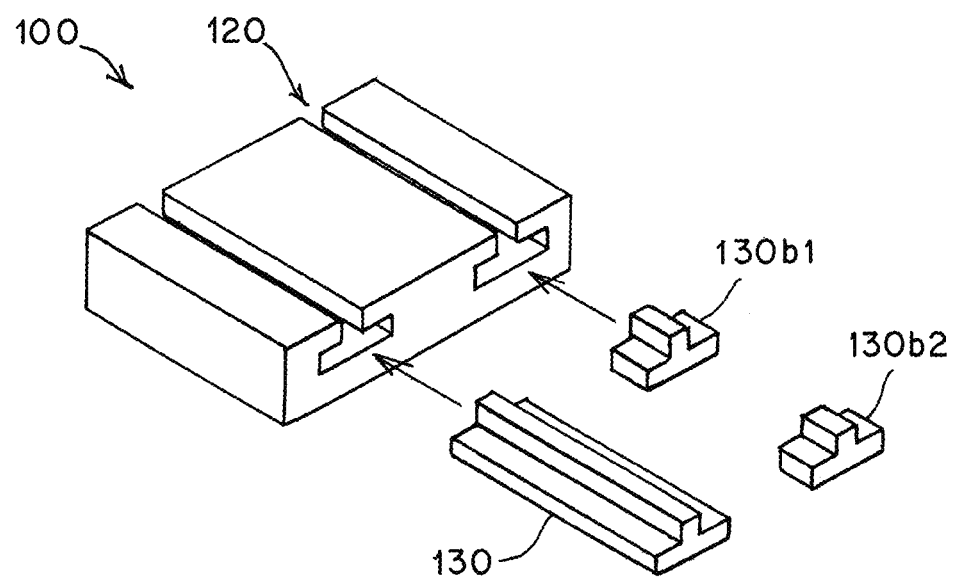
FIG. 5 is a perspective view of one embodiment of a plurality of inserts in a single recess.
Figure 6A:
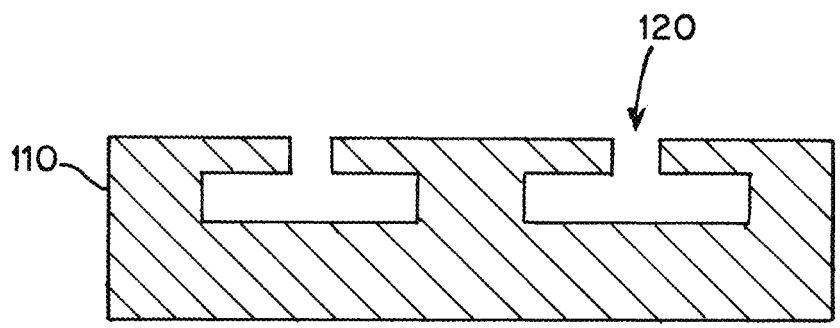
FIG. 6A is a cross-sectional side view of one embodiment of recesses within a build plate.
Figure 6B:
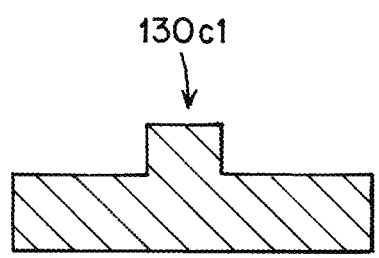
FIG. 6B is a cross-sectional side view of one embodiment of an insert configured to mate with the recesses of FIG. 6A.
Figure 6C:
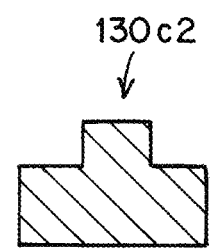
FIG. 6C is a cross-sectional side view of one embodiment of an insert configured to mate with the recesses of FIG. 6A.
Figure 6D:
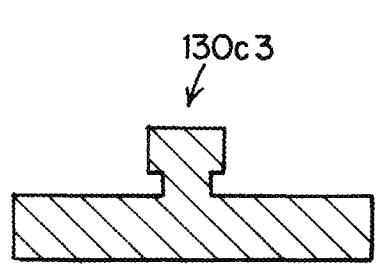
FIG. 6D is a cross-sectional side view of one embodiment of an insert configured to mate with the recesses of FIG. 6A.
Figure 6E:
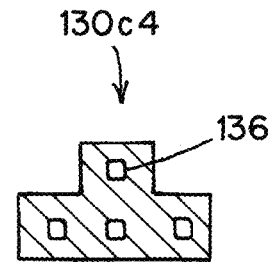
FIG. 6E is a cross-sectional side view of one embodiment of an insert configured to mate with the recesses of FIG. 6A.

In some embodiments, a recess 120 may be filled with a single insert 130 or a plurality of inserts 130b, as shown in FIG. 5. For example, inserts 130b1 and 130b2 may be inserted into a single recess 120. Each insert may be fixed within the recess using a locking component such as a set screw, or each insert may be allowed to move along the length of the recess, as the disclosure is not limited in this regard.

FIGS. 6A-6E depict cross-sectional geometries of a pair of recesses and different embodiments of inserts that may be mated with the recesses. Different inserts 130c with different cross-sections may be inserted into the same recess, such as the recess 120 in the build plate 110 shown in FIG. 6A. For example, the cross-section of a first insert 130c1 may have a size and/or shape that may substantially match a size and/or shape of the recess 120. A second insert 130c2 may have a similar shape as the first insert 130c1, but may have a different aspect ratio such that there is increased slop between at least one or more portions of the recess and the insert. For example, the neck portion of the insert configured to extend through an opening in the build surface may be substantially similar between the embodiments of FIGS. 6B and 6C while a width of the portion of the insert retaining the insert in a recess may be reduced in the embodiment of FIG. 6C. Regardless, the second insert 130c2 may still be configured to be inserted into and retained in the recess 120. A third insert 130c3 may have portions removed compared to the first insert 130c1. For example, the third insert 130c3 may include a bottom portion of the neck that has a smaller transverse dimension, such as a diameter, than an upper portion of the neck configured to have a part printed on it. The inclusion of a reduced dimension on a portion of a neck of an insert extending through an opening of a recess may affect the local stiffness of the insert where a part is connected to the insert. For example, the depicted insert may exhibit an increased compliance of the neck. Regardless, the third insert 130c3 may still be configured to be inserted into the same recess 120. Similarly, in another embodiment, a fourth insert 130c4 may include one or more portions 136 of removed material within a cross section of the insert. For example, as depicted in the figure, one or more cavities may extend along an axial length of the interior portion of an insert. Such an embodiment may be used to tailor the weight and/or the stiffness of the insert.

In some embodiments, an insert may be designed such that it forms a tight slip fit in the recess in which it is inserted. In this case, a significant amount of vertical motion of the insert may be eliminated simply by inserting the insert in the recess. However, inserting an insert that is configured to make a tight slip fit in a recess may be difficult and may include high precision machining and/or finishing of the recess and/or the insert. Over time, this tight slip fit may degrade such that the insert becomes loose or the insert is so tight that the insert can no longer be inserted into the recess. Accordingly, in some embodiments, a loose fitting insert may be used as detailed below.

As noted above, in some embodiments, a loose slip fit may be used between an insert 130 and a recess 120, as shown in FIG. 7A where gaps are present between one or more portions of the insert when disposed within the recess. While a loose slip fit may enable easier insertion and/or removal of the insert from the recess, and may be associated with less demanding dimensional tolerances, a loose slip fit may allow the insert to move within the recess, which may result in compromised part resolution and/or build errors. FIGS. 7B-7E show how a spring 152 may be used to bias the position of an insert 130 disposed within a recess 120 of a build plate 110 in a desired direction such that a portion of the insert is pressed against a corresponding portion of the recess to maintain the insert in a desired position and/or orientation. For instance, the spring 152 may preload the insert 130 in a direction towards the build surface 112 such that the insert is forced against an upper portion of the recess proximate to the build surface. In such an embodiment, the insert may be constrained from moving in a direction perpendicular to the build surface which may help to position the portion of the insert accessible through the corresponding opening in the build surface at a predetermined height relative to the build surface. The spring 152 may include a coil spring 152a, a leaf spring 152b, wavy washers, spring washers, stacked wavy washers 152c, and/or any other suitable biasing mechanism as the disclosure is not limited in this regard. Of course, other biasing mechanisms that may not be described as a spring may be used to control the vertical position of an insert within a recess, such as a set screw, as the disclosure is not limited in this regard.

Figure 8A:
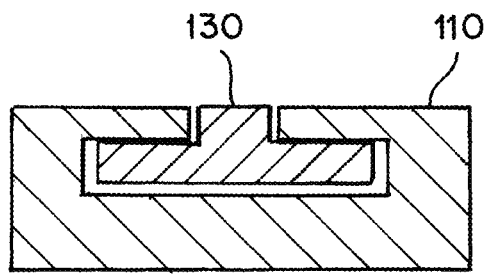
FIG. 8A is a cross-sectional side view of one embodiment of an insert disposed within a recess of a build plate with a tight fit.
Figure 8B:
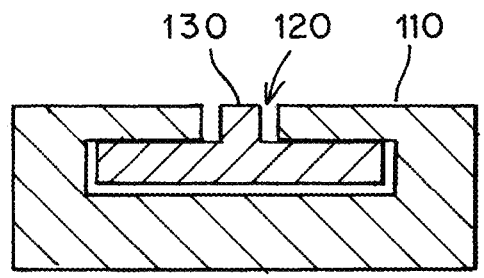
FIG. 8B is a cross-sectional side view of one embodiment of an insert disposed within a recess of a build plate with a loose fit.
Figure 8C:
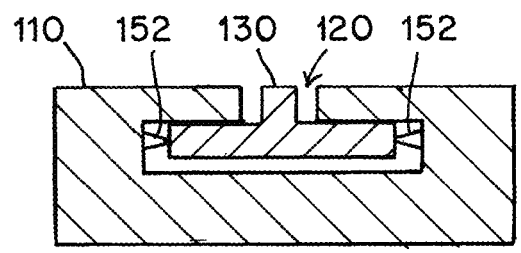
FIG. 8C is a cross-sectional side view of one embodiment of a build plate including a plurality of springs configured to bias an insert toward a center of a recess of the build plate.
Figure 8D:
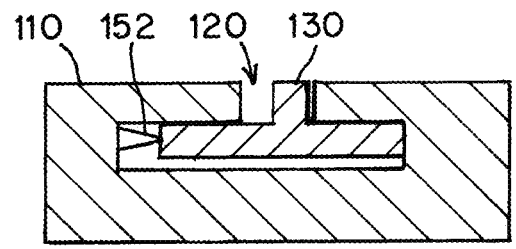
FIG. 8D is a cross-sectional side view of one embodiment of a build plate including a spring configured to bias an insert toward a side of a recess of the build plate.

FIGS. 8A-8D depict different lateral fits between an insert and a recess of a build plate. In some embodiments, the recess 120 and the insert 130 can be designed to prevent lateral motion of the insert 130 in the recess 120, as shown in FIG. 8A. The lateral fit of an insert in a recess may be determined in part by a width of a neck or a body of an insert and/or a recess. In some embodiments, the recess 120 and the insert 130 may be designed to allow some degree of lateral motion of the insert 130 in the recess 120, as shown in FIG. 8B. For example, an insert with a neck that is narrower than a corresponding opening in a build surface may be able to move laterally while an insert with a thicker neck and/or a neck that is matched to a size of the opening may either be constrained to move laterally to a lesser degree or not at all. Both embodiments may be designed with similar vertical stiffness properties. By allowing some lateral motion, the insert may accommodate motion in two directions to reduce induced thermal stresses to an even greater degree compared to an insert that does not allow any lateral motion and may only be able to accommodate motion along its length. For example, the insert of FIG. 8A may be configured to move, expand, and/or contract in a direction along its length (i.e., into the page), while the insert of FIG. 8B may be configured to also move in a lateral direction perpendicular to its length and parallel to the build surface.

Figure 9:
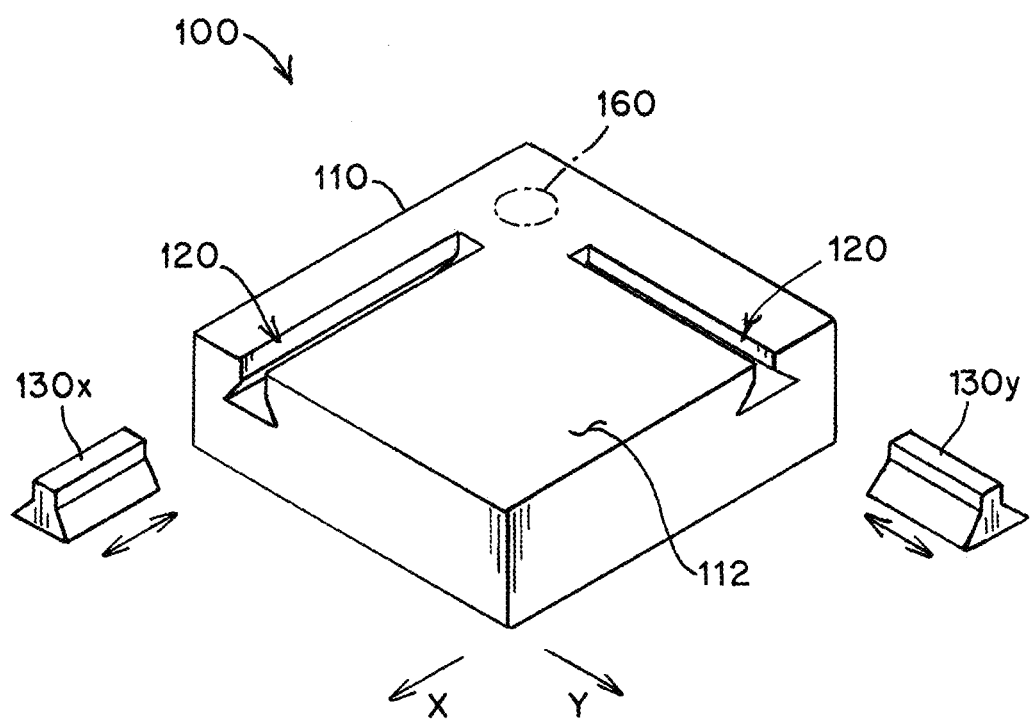
FIG. 9 is a perspective view of one embodiment of a build plate with perpendicular linear inserts.

In some embodiments, an insert may be biased to a preferred lateral position within the recess where a direction of the biasing force, and resulting movement, may be oriented in a direction that is parallel to the build surface FIG. 9 depicts one embodiment of a build plate 110 with recesses 120 that are oriented in two directions that are orthogonal to each other, though instances in which recesses that are oriented at different angles relative to each other are also contemplated. Correspondingly, when inserts 130 are inserted into the recesses 120, the inserts 130 may also be angled relative, e.g. orthogonal, to one another. A printed part may be attached to the build surface 112 of the build plate 110 at an attachment point 160, and may additionally be attached to one or more of the inserts 130. It should be appreciated that a part may be attached to the build surface and/or an insert at one or more attachment points, as the disclosure is not limited in regard to the number and/or location of attachment points. A first insert 130x may be aligned with an x-axis of the build plate, while a second insert 130y may be aligned with a y-axis of the build plate (wherein the x-axis and they y-axis are orthogonal). Accordingly, the first insert 130x may be configured to expand and/or contract along the x-axis, and the second insert 130y may be configured to expand and/or contract along the y-axis. In this configuration, stress may be reduced in a printed part along multiple directions simultaneously. While orthogonal recesses and inserts are shown in the figure, it should be appreciated that multiple recesses and/or inserts may be configured in any relative orientation, as the disclosure is not limited in this regard. It should be appreciated that, in some embodiments, an attachment point 160 may be aligned with one or more recess 120. However, this disclosure is not limited to embodiments in which one or more attachment points are aligned with one or more recesses. Additionally, embodiments in which a part is not directly attached to a build plate at an attachment point 160, and is instead only attached to the one or more inserts assembled with a build plate are also contemplated.

Figure 10A:
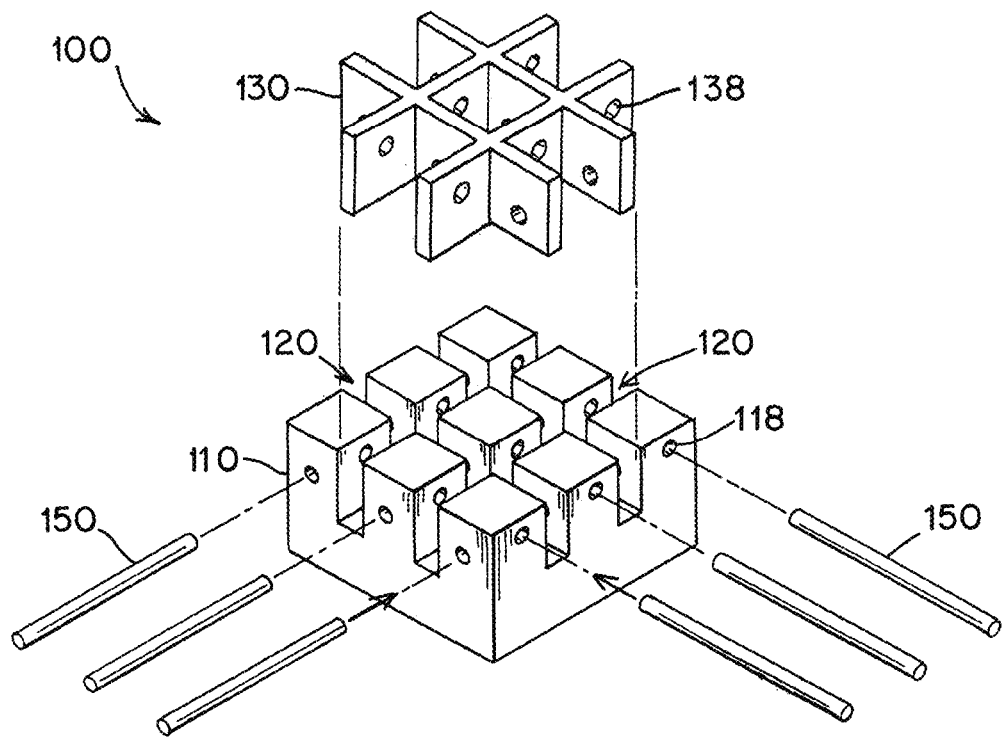
FIG. 10A is an exploded perspective view of one embodiment of a build plate with an insert that extends in two or more directions of the build plate.
Figure 10B:
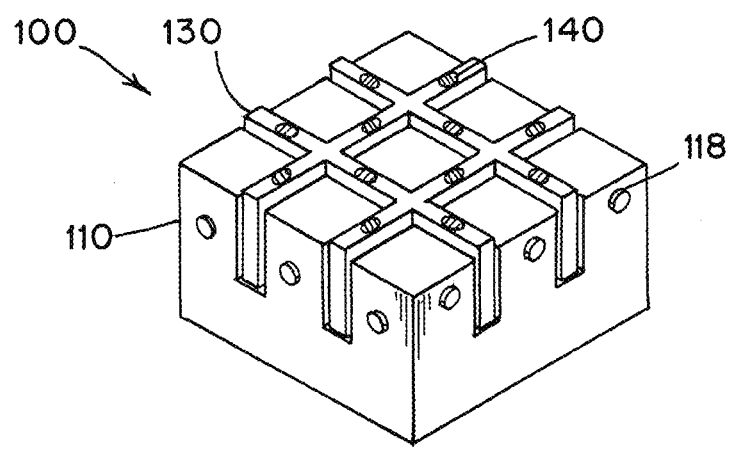
FIG. 10B is a perspective view of the build plate and insert of FIG. 10A.

FIGS. 10A-10B show different views of one embodiment of a build plate with an insert that includes portions that extend in at least two different directions. Similar to the linear inserts depicted in FIG. 1, the two-dimensional inserts depicted in FIGS. 10A-10B may be configured to accommodate thermal expansion and/or contraction of a part printed on the insert. However, whereas the linear inserts of FIG. 1 may, in some embodiments, be configured to expand/contract in a single direction, the two-dimensional inserts of FIGS. 10A-10B may be configured to expand/contract in a plurality of directions. For example, a two-dimensional insert may be configured to expand/contract in directions parallel to the plane of a build surface. It should be appreciated that a two-dimensional insert may still remain mechanically stiff in a direction perpendicular to the build surface. Because an insert may allow some contraction within the plane of the build, the force resisting the contraction of the printed part may be reduced, which may in turn reduce the tendency of the part to curl up or otherwise deform. Because an insert may be stiff in the direction perpendicular to the plane of the build, the insert may still resist the remaining curling load and help reduce the amount of undesirable curling deformation accumulated in the multiple printed layers.

Referring to FIGS. 10A-10B, a build plate assembly 100 may include a build plate 110 with one or more recesses 120, an insert 130, and one or more locking shafts 150. In the embodiment of the figure, the insert 130 is an insert that includes intersecting portions in the form of a grid that resemble a structural honeycomb where a size and shape of the grid is defined by a spacing and relative direction of the different sets of walls forming the structure. Regardless of the specific shape of the insert, the plurality of recesses 120 formed in the build plate 110 may have a corresponding arrangement of intersecting recess that are configured to receive the insert 130. The insert 130 may be configured to be inserted into the recesses 120 from above the build plate 110 (i.e., from a direction perpendicular to the build surface). After insertion of the insert 110 into the recesses 120, one or more locking shafts 150 may be inserted into holes 118 formed in the build plate 110 from the side of the build plate. The holes 118 may be aligned with corresponding holes 138 formed in the insert when the insert is positioned within the recesses. Correspondingly, as the locking shafts 150 are slid into the holes 118 of the build plate, the locking shafts 150 may additionally be inserted into holes 138 of the insert 130, thereby retaining the insert 130 in the recesses 120 and constraining relative motion between the insert 130 and the build plate 110. In some embodiments, the positions of holes 118 and 138 configured to receive the locking shafts 150 may depend, at least in part, on a direction from which a corresponding locking shaft 150 is inserted. For example, holes associated with a locking shaft inserted from a first direction may be located at a first vertical position relative to the build surface, whereas holes associated with a locking shaft inserted from a second direction may be located at a second vertical position relative to the build surface that is above or below the other locking shafts that would otherwise intersect with one another. In this way, non-parallel locking shafts 150 may nevertheless avoid intersection, as different locking shafts may be contained in different vertical planes relative to the build surface.

An insert 130 may include one or more attachment points 140 for a printed part. Referring to FIG. 10B, a grid insert may include preferred attachment points 140 disposed at locations collinear with a single wall of the grid. That is, in some embodiments, a preferred attachment point may not be disposed at an intersection of perpendicular walls of a grid insert. In this way, a single attachment point may only be configured to move in a single direction, which may provide less resistance for expansion and/or contraction of the printed part.

It should be appreciated that the material of the insert 130, locking shafts 150, and build plate 110 may all be individually selected to provide varying degrees of stiffness and thermal expansion. The grid spacing, height, and cross-sectional areas may all additionally be used to modify the stiffnesses. In this way, a vertically stiff and yet horizontally compliant structure may be designed that reduces the thermally induced stresses in a part and remains vertically stiff to help limit deformation due to any remaining thermal stress. An insert in the shape of a grid may be: machined from a single piece of stock; 3D printed; formed by bolting, welding, or otherwise joining multiple corrugated structures together; honeycomb expansion manufacturing processes; and/or any other appropriate manufacturing methods as the disclosure is not so limited.

Figure 11A:
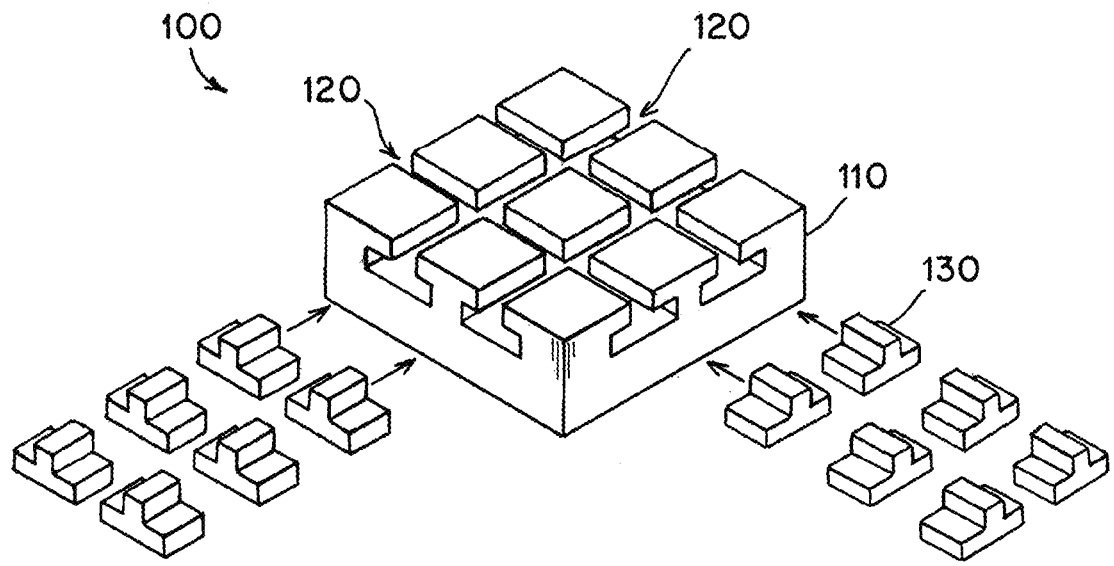
FIG. 11A is an exploded perspective view of one embodiment of a build plate with linear inserts oriented in different directions.
Figure 11B:
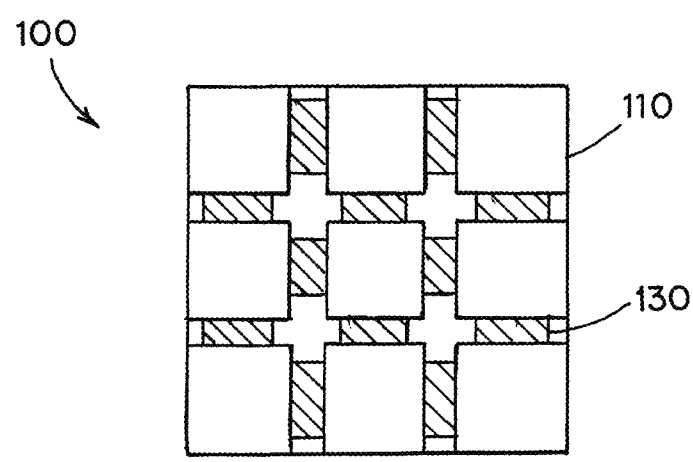
FIG. 11B is a top view of the build plate and linear inserts of FIG. 11A.

FIGS. 11A-11B show different views of one embodiment of a build plate with perpendicular recesses configured to receive linear inserts. The build plate 110 may include a plurality of recesses 120 that are angled relative to, and intersect with, one another. For instance, as shown in the depicted embodiment, the recesses are oriented substantially orthogonal to one other such that they intersect with one another at right angles though other angles are also contemplated. Each insert 130 may be configured to be inserted into a recess 120. Further, in some instances, the individual inserts may have lengths that are less than an axial length between adjacent intersections of the recesses. Thus, the inserts may be configured to be positioned within a single between two adjacent intersections as opposed to be positioned at an intersection or extending beyond two adjacent intersections of two or more recesses, as shown in FIG. 11B. Each insert may be configured to move in one or more directions within the associated recess as previously described. For instance, if an insert is tightly fit into a recess, the insert may be capable of movement in the direction of the axial length of the recess in which it is inserted. If an insert is loosely fit within a recess, the insert may move both in the direction of the length of the recess as well as in a lateral direction within the recess. Movement of an insert in more than one direction within a recess may be associated with full motion of all of the inserts collectively. As such, the attachment points of the printed part on the inserts may move within the printing plane, while still maintaining a desired vertical stiffness of the attachment points. In some embodiments, some inserts may be loosely fit, while others may be tightly fit. Some inserts may be fixed using a locking mechanism such as a set screw. In some embodiments, all the attachment points may be associated with inserts, while in some embodiments one or more attachment points may be associated with the build surface of the build plate and one or more attachment points may be associated with the inserts.

In some embodiments a build plate may be a single, monolithic part. For example, a build plate may include a large piece of material into which recesses may be machined. There may be certain advantages associated with a monolithic build plate, such as high stiffness and/or resistance to damage. However, there may be challenges associated with a monolithic build plate as well. For example, milling recesses into a build plate may be difficult, especially if a recess includes a T-slot. Additionally, a monolithic build plate may be limited to inserts that may be configured to be inserted into a recess from a side of the build plate, depending at least in part on the shapes of the recesses and inserts, as well as whether locking shafts are used.

Figure 12A:
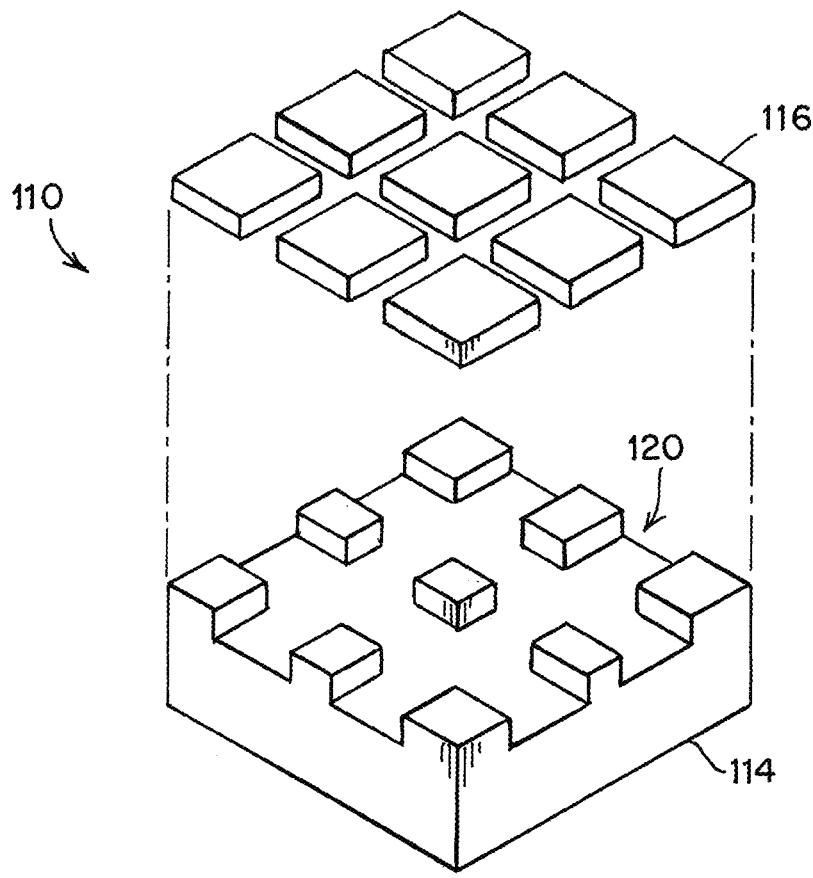
FIG. 12A is an exploded perspective view of one embodiment of a multi-part build plate comprising a base with a plurality of attachments.
Figure 12B:
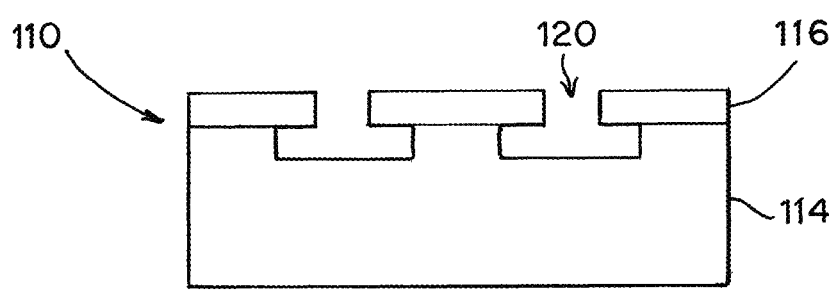
FIG. 12B is a side view of the multi-part build plate comp of FIG. 12A.

In view of the above, in some embodiments, there may be advantages associated with a build plate comprised of a plurality of parts that may cooperate to form the desired recesses there between. FIGS. 12A-12B show different views of one embodiment of a multi-part build plate 110 comprising a base 114 with a plurality of attachments 116. As seen in the exploded view of FIG. 12A, recesses 120 may be included in the base 114, and the attachments 116 may include separate plates. Thus, the recesses may be formed by one or more plates attached to a bottom base plate with the recesses formed between adjacent portions of the connected plates. For instance, as seen in the assembled view of FIG. 12B, when the attachments 116 are coupled to the base 114 the recesses 120 may be partially covered. Thus, a plurality of recesses with corresponding openings formed in a build surface between adjacent attachments similar to that described above may be easily formed in the resulting build plate such that an insert inserted into the recess may be unable to be removed from the recess in a direction perpendicular to the build surface. An attachment 116 may be coupled to a base 114 in any suitable manner, including but not limiting to clamping, threaded fasteners, welding, soldering, brazing, high temperature adhesives, and/or any other appropriate attachment method. An attachment may be removably or fixedly coupled to a base, as the disclosure is not limited in this regard.

Figure 13A:
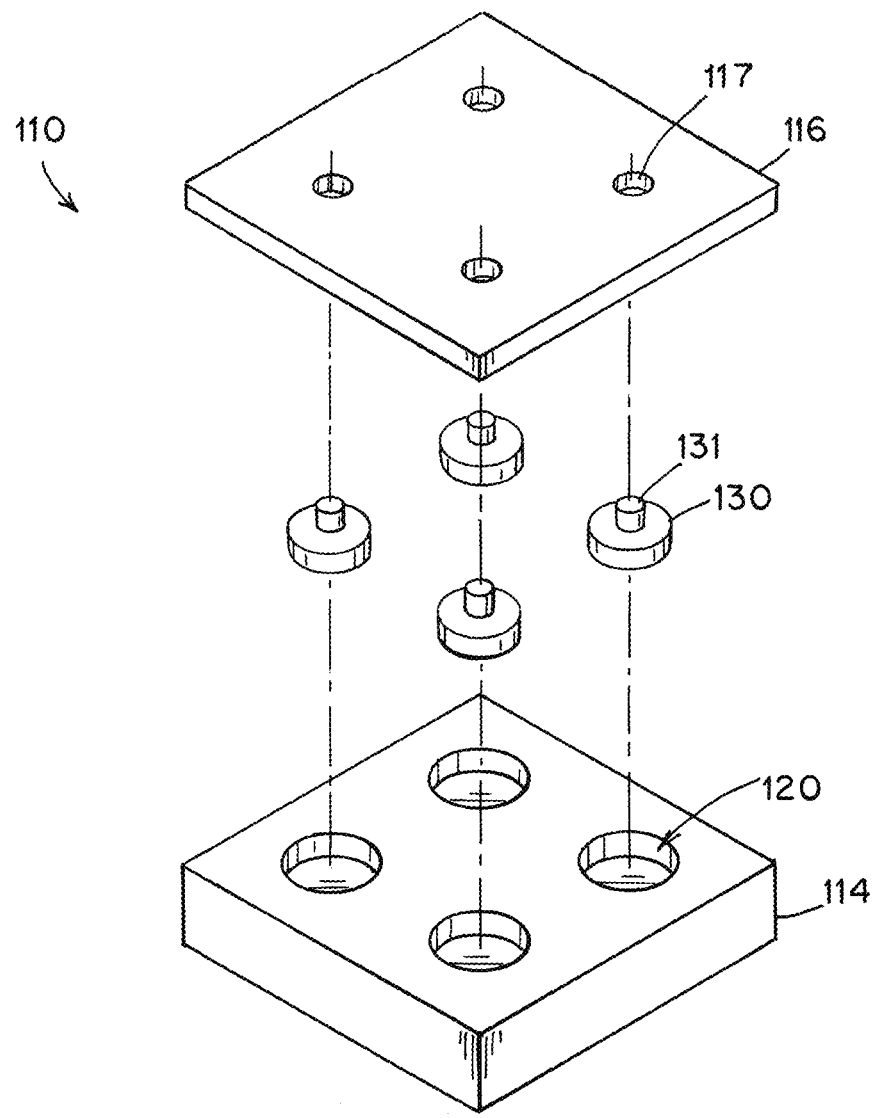
FIG. 13A is an exploded perspective view of one embodiment of a multi-part build plate with non-linear inserts.
Figure 13B:
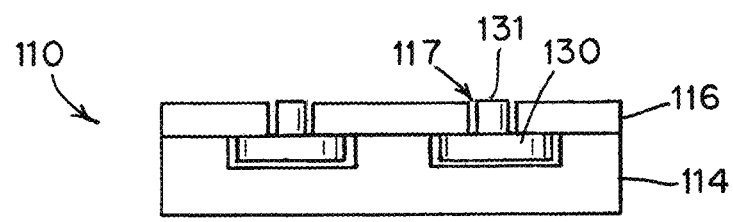
FIG. 13B is a side view of the multi-part build plate and non-linear inserts of FIG. 13A.

It should be appreciated that a multi-part build plate may be associated with easer insertion and/or removal of inserts into recesses, as an insert need not be slid into the recess from the side, but rather may be inserted from above the build plate prior to the attachments being placed onto and attached to the build plate. As seen in FIGS. 13A-13B, non-continuous recesses (e.g., recesses that may not connect to an edge of the build plate and/or other recesses) may be included in a surface of a multi-part build plate. Without wishing to be bound by theory, a multi-part build plate may be configured to accommodate inserts with an arbitrary two-dimensional geometry (when viewed from above). For example, FIGS. 13A-13B show different views of one embodiment of a build plate 110 with non-linear inserts that are substantially circular in cross-section (when viewed from above). Round inserts may be significantly easier and less expansive to manufacture, as they may be produced by machining cylindrical stock on a lathe or using any other appropriate manufacturing technique. Additionally, round inserts may be symmetrically compliant in any direction parallel to the build plane, and yet may remain stiff in a vertical direction. However, regardless of the specific shape a protrusion 117 extending upwards from the inserts, i.e. a neck of the inserts, may extend through an aligned opening 117 formed in in the attachment 116 in the form of one or more plates or other appropriate structure. Depending on the relative sizing of the inserts and protrusions relative to the recesses and necks, inserts with either greater or lesser ranges of motion may be provided.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A build plate assembly for an additive manufacturing system, the build plate assembly comprising:
   a build plate including a build surface and a recess formed in the build plate, wherein a portion of the recess forms an opening in the build surface;
   an insert configured to be inserted into the recess of the build plate, wherein the insert and the recess are sized and shaped to retain the insert in the recess, and wherein at least a portion of the insert is accessible through the opening, wherein a stiffness of the insert in a direction perpendicular to the build surface is different than a stiffness of the insert in a direction parallel to the build surface.

2. The build plate assembly of claim 1, wherein at least a portion of the insert extends outward from the build surface.

3. The build plate assembly of claim 1, wherein the insert is an elongated insert.

4. The build plate assembly of claim 1, wherein the insert comprises a variable cross section along its length.

5. The build plate assembly of claim 1, wherein a stiffness of the insert in a direction parallel to the build surface is less than a stiffness of the build plate in the direction parallel to the build surface.

6. The build plate assembly of claim 1, wherein at least a portion of the insert is fixed relative to the build plate.

7. The build plate assembly of claim 1, wherein the insert is slidably retained in the recess of the build plate.

8. The build plate assembly of claim 1, further comprising one or more locking shafts configured to prevent motion of the insert relative to the build plate.

9. The build plate assembly of claim 1, wherein the insert comprises a single piece.

10. The build plate assembly of claim 1, wherein the insert comprises a plurality of serially connected segments.

11. The build plate assembly of claim 1, wherein the build plate is at a temperature greater than an ambient temperature.

12. The build plate assembly of claim 1, wherein the build plate includes a bottom plate and a top plate coupled to the bottom plate, wherein the top plate and the bottom plate form the recess between the top plate and the bottom plate.

13. The build plate assembly of claim 1, wherein the recess is a circular recess.

14. The build plate assembly of claim 1, further comprising a spring and/or a screw configured to bias the insert toward a predetermined position within the recess.

15. An additive manufacturing method for reducing thermally induced stresses during an additive manufacturing process, the method comprising:
   inserting an insert into a build plate wherein at least a portion of the insert is accessible through an opening in a build surface of the build plate;
   retaining the insert in the build plate;
   depositing a layer of material on the build surface and the accessible portion of the insert;
   melting a first portion of the layer of material, wherein the first portion is disposed on the accessible portion of the insert; and
   solidifying the melted first portion to form a first attachment point on the insert.

16. An additive manufacturing system, comprising the build plate assembly of claim 1 and at least one laser energy source configured to direct laser energy towards the build plate.

17. The method of claim 15, further comprising:
   additively manufacturing a part on the first attachment point;
   removing the insert from the build plate; and
   separating the part from the insert.

18. The method of claim 15, wherein retaining the insert in the build plate includes inserting one or more locking shafts into the build plate.

19. The method of claim 15, further comprising preheating the build plate to a temperature greater than an ambient temperature prior to melting the first portion of the layer of material.

20. The method of claim 15, further comprising melting a second portion of the layer of material, wherein the second portion is disposed on the build surface.

21. The method of claim 20, further comprising solidifying the melted second portion to form a second attachment point on the build surface.

22. A build plate assembly for an additive manufacturing system, the build plate assembly comprising:
   a build plate comprising:
      a build surface, and
      a plurality of recesses formed in the build surface;
   a plurality of inserts configured to be disposed at least partially within the plurality of recesses of the build plate, wherein at least a portion of each of the plurality of inserts is accessible through a respective opening in the build surface, wherein each of the plurality of inserts is configured to be retained in at least one of the plurality of recesses, wherein a stiffness of each of the plurality of inserts in a direction perpendicular to the build surface is different than a stiffness in a direction parallel to the build surface.

23. The build plate assembly of claim 22, wherein at least a portion of at least one of the plurality of inserts extends outward from the build surface.

24. The build plate assembly of claim 22, wherein a stiffness of each of the plurality of inserts in a direction parallel to the build surface is less than a stiffness of the build plate in the direction parallel to the build surface.

25. The build plate assembly of claim 22, further comprising one or more locking shafts configured to prevent motion of the plurality of inserts relative to the build plate.

26. The build plate assembly of claim 22, wherein each of the plurality of inserts is an elongated insert.

27. The build plate assembly of claim 26, wherein two or more elongated inserts are parallel to each other.

28. The build plate assembly of claim 26, wherein two or more elongated inserts are angled relative to each other.

29. The build plate assembly of claim 22, wherein each recess of the plurality of recesses is an elongated recess.

30. The build plate assembly of claim 29, wherein at last a portion of the plurality of recesses intersect.

31. The build plate assembly of claim 30, wherein the plurality of recesses intersect to form a grid.

32. The build plate assembly of claim 22, wherein the build plate includes a bottom plate and a top plate coupled to the bottom plate, wherein the top plate and the bottom plate form at least a portion of the plurality of recesses between the top plate and the bottom plate.

33. The build plate assembly of claim 22, wherein each of the plurality of recesses is a circular recess.

34. The build plate assembly of claim 22, further comprising a biasing mechanism configured to bias at least one of the plurality of inserts toward a predetermined position within at least one of the plurality of recesses.

35. An additive manufacturing method for reducing thermally induced stresses during an additive manufacturing process, the method comprising:

inserting a plurality of inserts partially into a plurality of recesses formed in a build surface of a build plate, wherein at least a portion of each of the plurality of inserts is accessible through at least one opening in the build surface;

retaining the plurality of inserts in the plurality of recesses;

depositing a layer of material on the build surface and the portions of the plurality of inserts accessible through the at least one opening in the build surface;

melting at least a first portion of the layer of material disposed on the accessible portions of the plurality of inserts; and solidifying the first melted portion to form a first attachment point on at least one of the plurality of inserts.

36. The method of claim 35, further comprising:

additively manufacturing a part on the first attachment point;

removing the plurality of inserts from the build plate; and separating the part from the plurality of inserts.

37. The method of claim 35, wherein retaining the plurality of inserts in the plurality of recesses includes inserting one or more locking shafts into the build plate.

38. The method of claim 35, further comprising preheating the build plate to a temperature greater than an ambient temperature prior to melting the first portion of the layer of material.

39. The method of claim 35, further comprising melting a second portion of the layer of material, wherein the second portion is disposed on the build surface.

40. The method of claim 39, further comprising solidifying the melted second portion to form a second attachment point on the build surface.

41. An additive manufacturing system, comprising the build plate assembly of claim 22 and at least one laser energy source configured to direct laser energy towards the build plate.

* * * * *